United States Patent Office 2,857,293
Patented Oct. 21, 1958

2,857,293

SELENIUM RECTIFIERS

Eric Lionel French, London, England, assignor to Westinghouse Brake and Signal Company, Limited, London, England No Drawing. Application June 7, 1956
Serial No. 589,880

Claims priority, application Great Britain June 15, 1955

6 Claims. (Cl. 117—200)

My invention relates to selenium rectifiers of the kind in which an artificial or non-genetic layer is provided between the selenium and counterelectrode layers.

According to the invention, in a rectifier of the kind described, the non-genetic layer consists of polyvinyl chloride.

According to one method of putting the invention into effect an incomplete rectifier element consisting of a base plate having a layer of selenium applied to it, the selenium being in its crystalline form, is immersed for one minute in a saturated solution of polyvinyl chloride of the kind sold under the trade name "Corvic P. M." dissolved in a solvent mixture consisting of 20 parts by volume of aniline and 80 parts by volume of xylene, the solution being maintained at a temperature of 110° C. The plate is then removed from the solution, being arranged with its plane vertical and being withdrawn vertically at a rate of six inches per minute. The temperature of which this dipping is performed and the rate of withdrawal are so chosen that the solvent mixture evaporates almost completely and the plate is dry in appearance within a few seconds of its being withdrawn from the solution. Preferably the plate is then exposed to radiant heat for a few minutes in order to remove the solvent mixture completely. The counterelectrode is then applied and the element electroformed in known manner.

It is possible to use xylene alone as a solvent for polyvinyl chloride, but, although the proportion of solute dissolved at 110° C. is then only 0.01 percent by weight, satisfactory rectifiers can be produced. The addition of aniline has a pronounced beneficial effect upon the electrical characteristics of the rectifier, and, in particular, improved electroforming.

Other solvents may be used in place of xylene such, for example, as nitrobenzene or a ketone such as methyl ethyl ketone. Other primary amines may be used in place of aniline, for example, butylamine. The primary amine selected should have a boiling point close to that of the solvent in order to insure rapid evaporation of both solvent and amine when the plate is removed from the solution. If methyl ethyl ketone having a boiling point of 80.6° C. is used as the solvent, a suitable amine is butylamine having a boiling point of 79° C. The rate of evaporation also depends upon the ambient temperature and the rate of air flow past the plate. The procedure set out above has been found suitable for an aniline-xylene solvent mixture, used in a room at a temperature of 15° C. and having a normal degree of ventilation, the resulting rectifier having a non-genetic layer of such a thickness that the forward resistance of the rectifier is of a reasonable value. Variation of any of the conditions results in a change in this forward resistance but, in practice, it has been found convenient when a change in the forward resistance is desired, to change the concentration of the solution accordingly and to maintain all other conditions constant. The effects of variation of these other conditions are complex, but are similar to those well known in the art of forming paint films.

During the application of the polyvinyl chloride the base plate necessarily becomes covered with a film of this material but the film is so thin that its resistance is small and the forward resistance is not increased unduly.

Although I have herein described several methods of forming a non-genetic or barrier layer on the selenium layer of a cell, it is to be understood that various changes and modifications may be made therein within the scope of the appended claims without departing from the spirit and scope of my invention.

Having thus described my invention, what I claim is:

1. In a method of manufacturing selenium cells, the step of applying to the selenium layer on a base plate a saturated solution of polyvinyl chloride to which a primary amine has been added, to form a non-genetic layer.

2. In a method of manufacturing selenium cells, the step of applying to the selenium layer on a base plate a solution of polyvinyl chloride dissolved in a solvent of approximately 20 parts by volume of aniline and approximately 80 parts by volume of xylene, to form a non-genetic layer.

3. In a method of manufacturing selenium cells, the step of applying to the selenium layer on a base plate a solution of polyvinyl chloride dissolved in xylene, to form a non-genetic layer.

4. In a method of manufacturing selenium cells, the step of applying to the selenium layer on a base plate a solution of polyvinyl chloride dissolved in nitrobenzene, to form a non-genetic layer.

5. In a method of manufacturing selenium cells, the step of applying to the selenium layer on a base plate a solution of polyvinyl chloride dissolved in a ketone, to form a non-genetic layer.

6. In a method of manufacturing selenium cells, the step of applying to the selenium layer on a base plate a solution of polyvinyl chloride dissolved in methyl ethyl ketone, to form a non-genetic layer.

References Cited in the file of this patent

UNITED STATES PATENTS 2,476,800   Blackburn _____ July 19, 1949